No. 621,133. Patented Mar. 14, 1899.
C. POHLIT.
GEAR FOR BACK SIGHTS OF GUNS OR ORDNANCE.
(Application filed Apr. 7, 1898.)

(No Model.) 2 Sheets—Sheet 1.

WITNESSES:
Geo Eisenbraun
E. P. Hendrickson.

INVENTOR:
Carl Pohlit
By A. Faber du Faur
ATTORNEY.

No. 621,133. Patented Mar. 14, 1899.
C. POHLIT.
GEAR FOR BACK SIGHTS OF GUNS OR ORDNANCE.
(Application filed Apr. 7, 1898.)
(No Model.) 2 Sheets—Sheet 2.

WITNESSES:
G. W. Eisenbraun
E. P. Hendrickson.

INVENTOR:
Carl Pohlit
By A. Faber du Faur
ATTORNEY.

UNITED STATES PATENT OFFICE.

CARL POHLIT, OF ESSEN, GERMANY, ASSIGNOR TO FRIED. KRUPP, OF SAME PLACE.

GEAR FOR BACK-SIGHTS OF GUNS OR ORDNANCE.

SPECIFICATION forming part of Letters Patent No. 621,133, dated March 14, 1899.

Application filed April 7, 1898. Serial No. 676,745. (No model.)

*To all whom it may concern:*

Be it known that I, CARL POHLIT, a citizen of the German Empire, residing at Essen, Germany, have invented Improvements in Gears for Back-Sights of Guns or Ordnance, of which the following is a specification.

In the known constructions of the back-sights of guns the arrangement is such that the worm which serves for adjusting the back-sight bar is capable of being moved in opposition to the pressure of a spring out of engagement with the back-sight bar in order to enable the approximate adjustment of the back-sight to be effected directly by hand, so as to save time; but as in this arrangement, by reason of the yielding support or bearing of the worm, the back-sight bar might get shifted in consequence of the jumping of the gun, the back-sight bar must be secured after being adjusted by means of a clamping-screw.

Now the present invention relates to a back-sight for guns in which notwithstanding the screw for clamping the back-sight is dispensed with the back-sight after adjustment will remain with perfect certainty in its position for the prescribed range, even during the rapid firing of the gun, while for the purpose of preliminary adjustment the worm is adapted to be placed out of gear with the back-sight bar.

The accompanying drawings illustrate a suitable form of the present invention.

Figure 1:
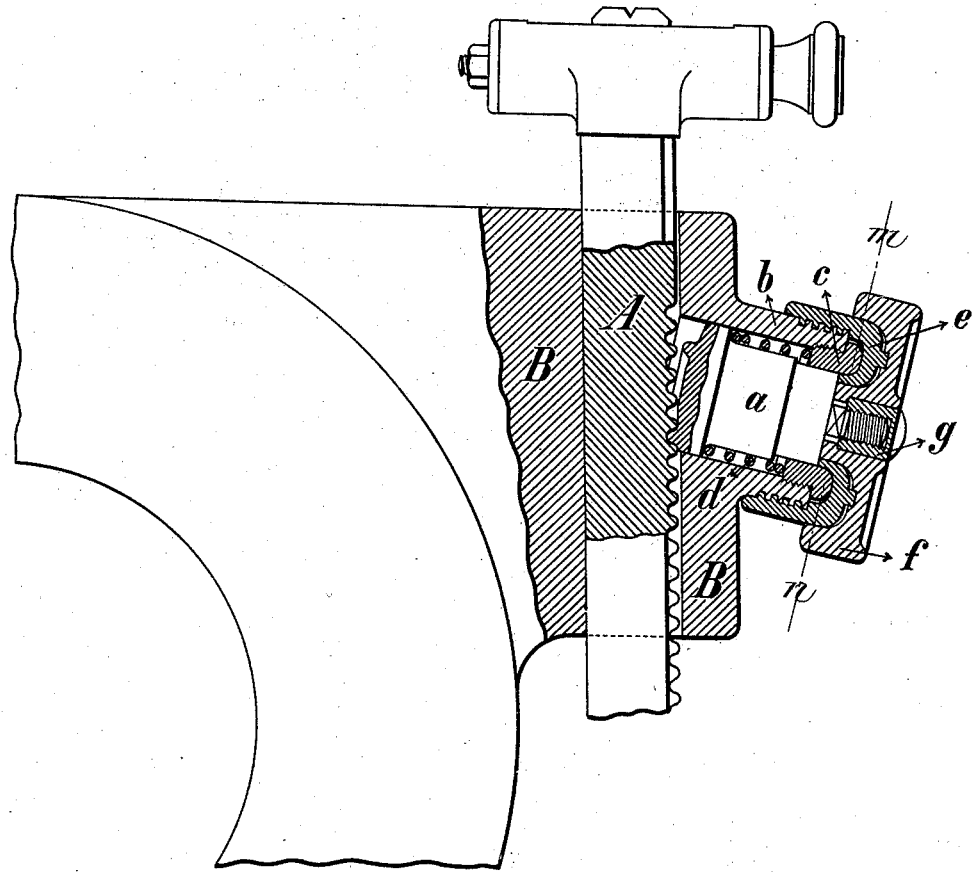
Figure 4:
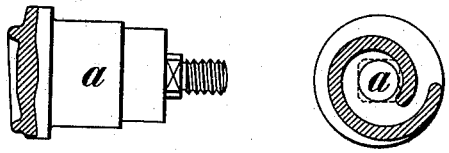
Figure 2:
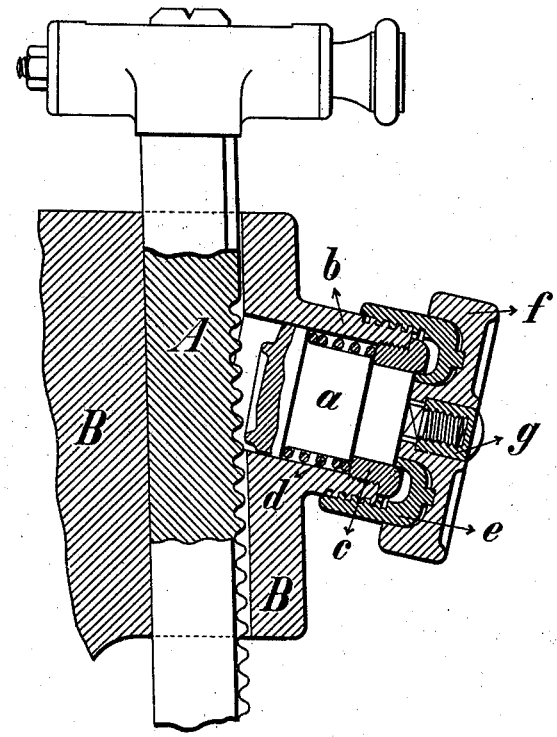
Figure 3:
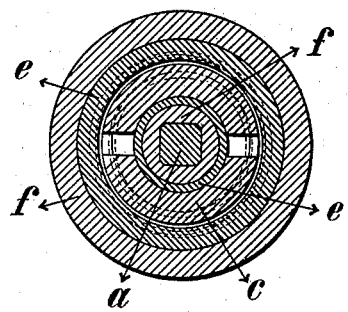

Figures 1 and 2 show a rear elevation of a part of the gun-barrel with the back-sight mounted thereon. (Fig. 1 shows the worm of the worm-gear in engagement with the teeth of the back-sight bar, while Fig. 2 shows the worm out of gear therewith.) Fig. 3 is a section through the worm-gear on the line *m n* of Fig. 1. Fig. 4 illustrates the well-known worm of the worm-gear.

The worm *a*, which is fixed to the small hand-wheel *f*, is rotatably mounted in an arm *b* of the back-sight casing B, Fig. 1. The worm bears with a collar or shoulder against the spring *d*, which has its abutment against the closing-sleeve *c*, which latter is screwed into the arm *b*. The sleeve *c* serves to guide the worm *a* and to limit the rearward travel of the latter. The adjusting-sleeve *e*, which screws onto the arm *b*, is curved inward to bear against a shoulder on the stem of the hand-wheel and worm and in the opposite direction against the small hand-wheel. The arrangement is also, as shown, such that the least possible friction is produced between the worm *a* or hand-wheel *f* and the adjusting-sleeve *e*.

When the approximate adjustment of the back-sight rack-bar A for the prescribed range is to be effected by pushing the back-sight bar up and down by hand, the worm *a*, Fig. 1, must first be moved out of engagement with the teeth of the back-sight A. For this purpose the adjusting-sleeve *e* is rotated through half a revolution toward the left hand, whereby it unscrews from the arm *b* (provided with a double right-handed screw-thread) of the back-sight casing B and at the same time moves the hand-wheel *f*, together with the worm *a*, with it. The pitch of the screw-thread of the adjusting-sleeve *e* is made such that by rotating the latter through one-half a revolution the worm *a* moves out of engagement with the teeth of the back-sight, Fig. 2. The approximate adjustment of the sight having been effected by hand, the adjusting-sleeve *e* is rotated in opposite direction, so as to screw it upon the arm *b* of the casing B, thereby returning the worm *a* into engagement with the rack-bar A. The spiral spring, which was compressed in moving the worm out of engagement with the rack-bar, expands, facilitates the turning of the sleeve *e* for returning the worm into engagement, steadies the worm, prevents rattling if there should be any looseness in the fit of the parts, and tends by friction to prevent any slight displacement of the worm around its axis on the recoil of the gun. By rotating the small hand-wheel *f* in the forward or in the backward direction the exact adjustment of the back-sight is now effected in the usual manner by causing the scale-mark for the prescribed range to coincide with the upper surface of the back-sight casing. In this operation the adjusting-sleeve *e* remains stationary, because the friction produced between it and the worm or the hand-wheel is smaller than the friction between it and the screw-thread of the arm *b*. During the firing the worm *a* is not able to shift to the right hand and so shift the back-sight, because the worm bears against the adjusting-sleeve e, and the latter does not change its position during the firing.

Another form of construction according to this invention is constituted by providing instead of the screw-thread an angularly-bent groove or slot in the arm b and into which groove there engage projections on the adjusting-sleeve e. This arrangement is not specially shown because it can be readily understood without. So long as the projections on the adjusting-sleeve e are situated in those parts of the angularly-bent groove which are directed at right angles to the longitudinal axis of the worm a no movement of the worm can take place in the axial direction; but if, on the contrary, the projections on the adjusting-sleeve e are brought by rotating the latter into those parts of the angularly-bent groove which are situated parallelly or at a less than right angle to the axis of the worm a the worm a can then be drawn back and out of engagement with the back-sight rod A. It is also obvious that without altering the nature of this invention in any way the screw-thread or the angularly-bent groove might be arranged on the worm and that the adjusting-sleeve might be connected with the arm b in a rotatable manner, but not so as to be capable of being moved along said arm.

I claim—

1. The combination with the casing B of a back-sight for guns, of a rack-bar A; a worm a guided within the casing and engaging the rack-bar A for making the final adjustment of the sight and for holding it in adjustment; a hand-wheel f attached to the shank of the worm; and a sleeve e axially adjustable on the casing, bearing against the hand-wheel and curved inward to bear against a shoulder on the stem of the hand-wheel and worm, whereby the hand-wheel and worm are positively held against independent movement either outward or inward, substantially as and for the purpose specified.

2. The combination with the casing B of a back-sight for guns, of a rack-bar A; a worm a guided within the casing and engaging the rack-bar A for making the final adjustment of the sight and for holding it in adjustment; a hand-wheel f attached to the shank of the worm; a screw-sleeve e adjustable on the casing, bearing against the hand-wheel and turned inward to bear against a shoulder on the stem of the hand-wheel and worm, whereby the hand-wheel and worm are positively held against independent movement either outward or inward, substantially as and for the purpose specified.

3. The combination with the casing B of a back-sight for guns, of a rack-bar A; a worm a guided within the casing and engaging the rack-bar A for making the final adjustment of the sight and for holding it in adjustment; a hand-wheel f attached to the shank of the worm; a sleeve e axially adjustable on the casing, bearing against the hand-wheel and curved inward to bear against a shoulder on the stem of the hand-wheel and worm; and a spring d abutting against an inner shoulder on the shank of the worm and against a stop in the arm b, substantially as and for the purpose specified.

4. The combination with the casing B of a back-sight for a gun, of a hollow arm b projecting therefrom; a rack-bar A; a worm inserted into the hollow arm b and engaging the rack-bar A for making the final adjustment of the sight and for holding it in adjustment; a hand-wheel f attached to the shank of the worm a; a sleeve e screwed onto the hollow arm b; said sleeve e being curved inward to bear against a shoulder on the stem of the hand-wheel and worm and projecting into an annular recess of the hand-wheel so as to form a swivel connection with it; and a spring d placed between the inner shoulder of the worm a and an internal shoulder on the arm b; the hand-wheel and worm being positively held by shoulders on the sleeve e against movement either outward or inward, and adjusted by turning the sleeve e, substantially as and for the purpose specified.

In testimony that I claim the foregoing as my invention I have signed my name in presence of two subscribing witnesses.

CARL POHLIT.

Witnesses:
   JOHN BAKER,
   WILLIAM ESSENWEIN.